Oct. 20, 1925.  1,558,348
C. E. FERREE ET AL
METHOD OF AND APPARATUS FOR VISION TESTING, ETC
Filed Jan. 24, 1921   4 Sheets-Sheet 2

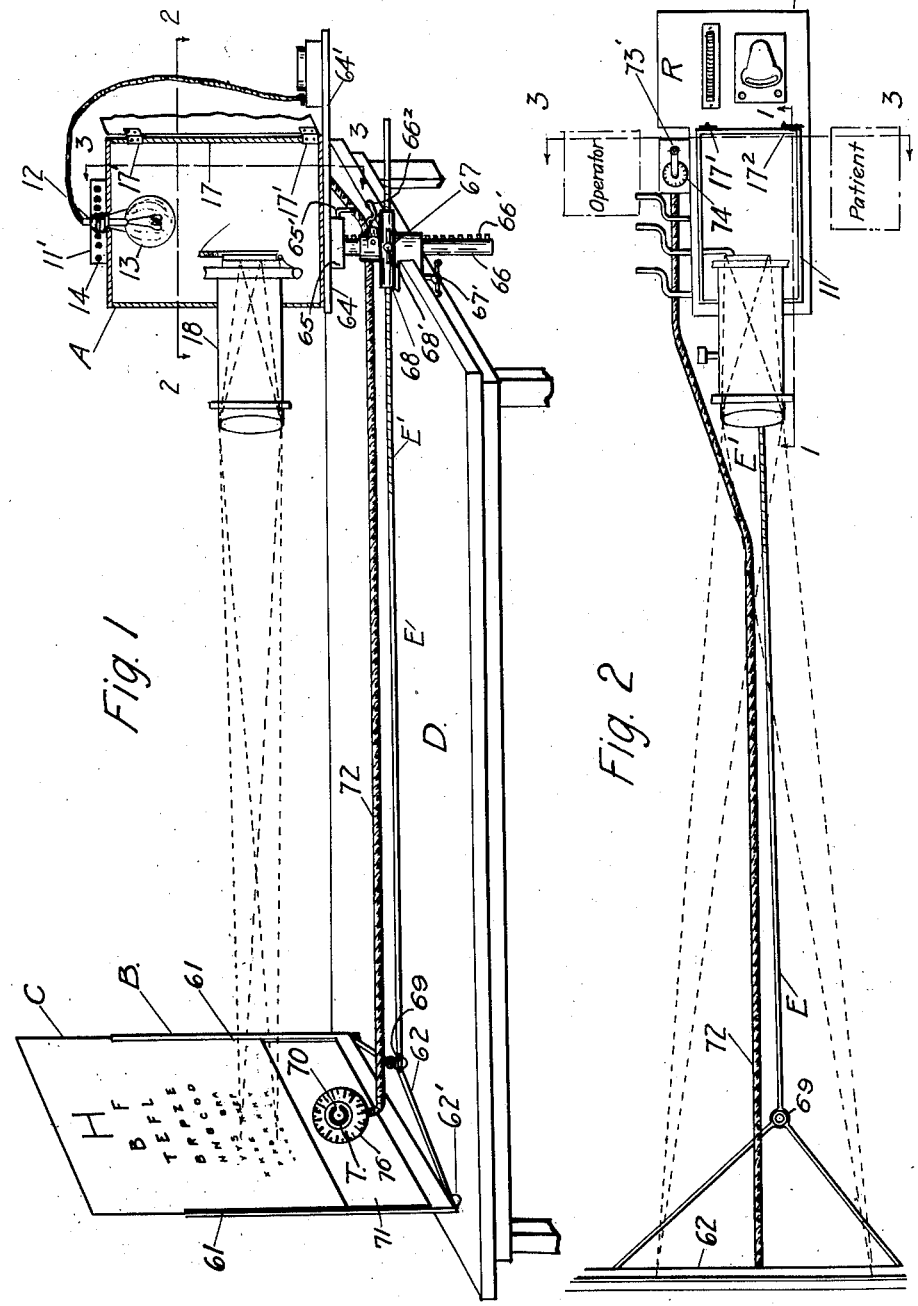

Oct. 20, 1925.
C. E. FERREE ET AL
1,558,348
METHOD OF AND APPARATUS FOR VISION TESTING, ETC
Filed Jan. 24, 1921   4 Sheets-Sheet 3
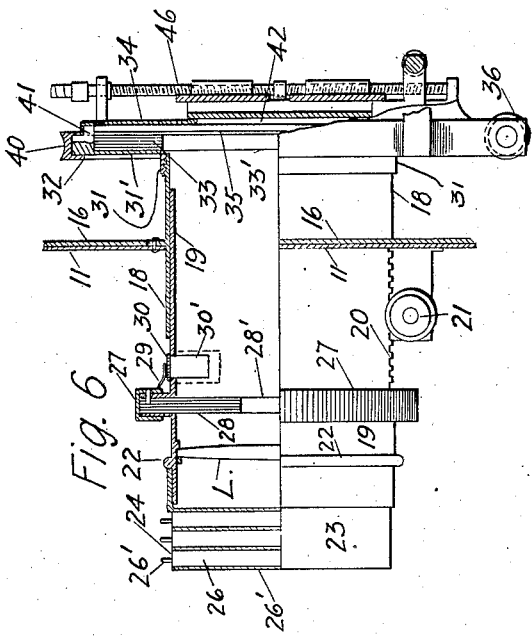
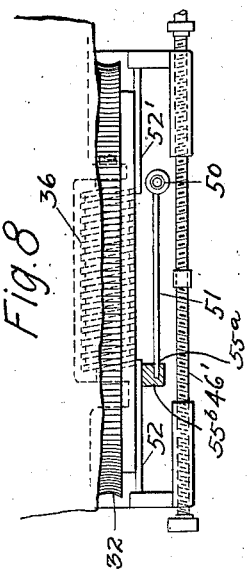
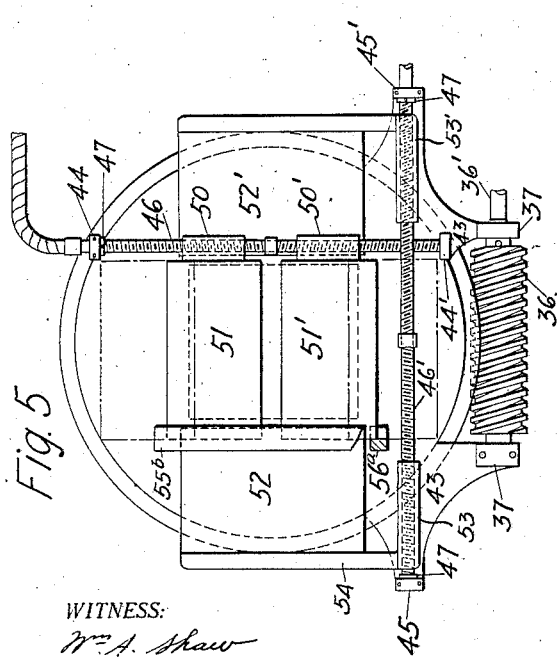
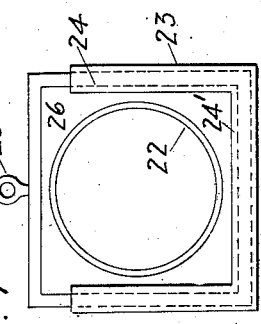
INVENTORS

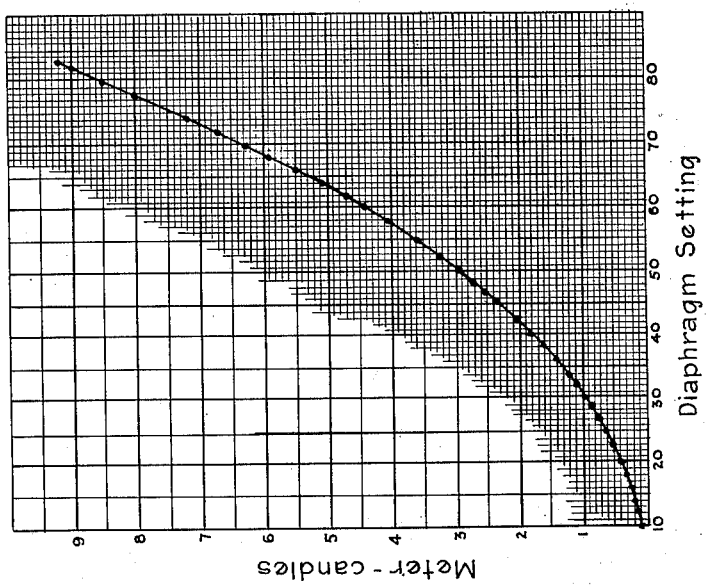

Patented Oct. 20, 1925.

1,558,348

UNITED STATES PATENT OFFICE.

CLARENCE ERROL FERREE AND GERTRUDE RAND FERREE, OF BRYN MAWR, PENNSYLVANIA.

METHOD OF AND APPARATUS FOR VISION TESTING, ETC.

Application filed January 24, 1921. Serial No. 439,572.

*To all whom it may concern:*

Be it known that we, CLARENCE ERROL FERREE and GERTRUDE RAND FERREE, both citizens of the United States of America, residing at Bryn Mawr, in the county of Montgomery and State of Pennsylvania, have invented certain new and useful Improvements in Methods of and Apparatus for Vision Testing, Etc., of which the following is a specification.

The objects of our invention or discovery herein first disclosed, shown, described and claimed, is, by our new and improved method, usually and preferably but not necessarily, carried out and performed by a new and improved apparatus, also of our invention, herein also first disclosed, described and claimed, to accurately test the human vision, in practically all its various phases, such for instance as testing the light and the color sense; for testing roughly and minutely acuity of vision under various degrees of illumination of the object, and determination of the degree of illumination at the threshold of perception of the particular individual eye being tested; and also for testing the eyes in other ways, all as more particularly and at large hereinafter set forth; or in other words, our said new and improved method and apparatus for visional capacities, etc., are each more especially designed and adapted for use in making what are known as eidoptometric, photoptometric, and chromatoptometric visional tests, etc. And all such three classes of tests are those most essential for determining the visional fitness of individuals for various positions in the military and naval services, especially in the naval and aviation branches thereof. such as pilots, observers, etc., and in many other like fields, in the peaceful arts and occupations where the highest visional efficiency especially when practically instantaneous perceptive visional acuity, under low illuminations is required, to prevent frequent great loss of life and property.

To such ends our said new and improved visional testing apparatus, designed and invented by us, for use in carrying out and performing the said new and improved method of visional testing also invented by us, and preferably but not necessarily used for carrying out and performing our said method, which apparatus is not by any manner of means limited to such use, inasmuch as the same is adaptable for use for many other purposes in the optical, light-projection, and allied arts; all without departing from the broad scope of our said invention, as herein shown, described and claimed; which considered in its broad aspects, comprises a light-projecting apparatus, in which the light-source may be measurably varied within wide limits; and the projected lightbeam also varied in shape, size and intensity, each micrometically measurably indicated by suitable index devices; the light-beams projected illuminating suitable test-letters, or objects, including variably adjustably positioned test-objects of our invention, supported upon a suitable screen or support, variably positioned according to measure indicating index devices at suitable distances from the light-projecting apparatus; and also comprises certain other, and minor mechanisms and appurtenances, hereinafter more particularly set forth in the specification and pointed out in the claims; and possesses many capabilities, qualities and uses, other than those hereinbefore mentioned.

Our said new and improved apparatus for visional testing together with the manner of operating the same in the carrying out and performing of our said new and improved method of visional testing, are each fully shown and described in the following specification, of which the accompanying drawings form a part, wherein similar letters or numerals of reference designate like or equivalent parts wherever found thruout the several views, and in which:

Figure 1, is a side-view in elevation of one form of our said vision testing apparatus, used in carrying out and performing our said new and improved method of vision testing, the light projecting apparatus being shown in central vertical longitudinal section, on the line 1—1, of Fig. 2, looking in the direction of the arrows; the light rays being transmitted being shown by the dotted-lines; and the light receiving testingscreen upon which such light-rays impinge being for clearness shown in perspective as it would appear to a person positioned close to the light-projecting apparatus on the left hand side thereof looking toward the screen.

Fig. 2, is a top plan view of the apparatus as shown in Fig. 1, the light projector housing being shown in horizontal section taken on the line 2—2 of Fig. 1.

Fig. 3, is a rear view, on a somewhat larger scale than that of Figs. 1 and 2, of the light-transmitting apparatus, taken in section on the line 3—3 of Figs. 1 and 2, looking in the direction of the arrows.

Fig. 5, is a rear view in detail, on an enlarged scale of the light-projecting tube and actuating mechanism shown in position in the housing, in Figs. 1, 2, and 3;

Fig. 6, is a side view of the light-projection tube, etc., in position in the front-wall of the projection-apparatus housing, (which is shown in section) looking toward the right of Figs. 3, and 5, the bottom half being shown in perspective, (except for a small portion broken away at the right) and the top-half in central vertical section;

Fig. 7, is a front end view of the light-projecting tube, looking toward the right of Fig. 6, with one light-filter in position thereon, and Fig. 8, is a top-view of the vertical and horizontal light-slit stop-plates shown at the extreme right of Fig. 6, and extreme front of Fig. 5.

Fig. 9, is a front face view of the calibration-chart table, from which is compiled the plotted-curve of the chart shown in Fig. 10; which Fig. 10, with its curve, is derived by photometric calibration of one of our improved visional testing apparatus, machines or devices, made for the purpose of determining the photometric characteristics of that particular apparatus.

Figure 4:
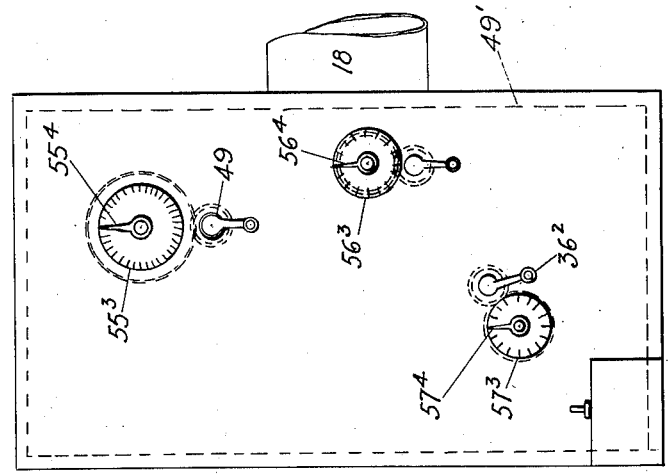
Fig. 4, is an exterior view of the light-projecting apparatus housing, looking toward the left of Fig. 3.

Referring to the drawings:

The reference letter A, designates the light-projecting apparatus, and B, the screen frame carrying the lettered test-cards, the movable variously positioned test object or objects; and any other test objects to be illuminated by the projected-light.

The light-projecting apparatus comprises a housing 11, usually of thin sheet-steel, or other suitable metal, and of the rectangular form shown, having the top central extension 11′, carrying at its center the electric-light socket 12, in which is supported the electric projection-lamp 13. The annular wall of the extension 11′, is provided with air-holes or perforations 14; and a like line of holes 14′, are provided at the bottom of the housing, those at the top having an annular light-shield 15, and those at the bottom a like shield 15′, suitably located, whereby the passage of light out thru such holes is prevented. As it is essential in order to obtain the highest quality of test results, that the light transmitted to the test objects for their illumination should be thoroughly diffused-light only, the housing is provided with an interior light-diffusing lining 16, of any suitable diffusing character; and for such lining 16, we have found opal-glass ground upon one face (usually but not necessarily that in abutment with the inner face of the housing wall) to be of high efficiency for such use.

For convenience of access to the interior of the housing 11, the same is provided with a suitable door 17, (Figs. 1 and 2) usually hinged as shown to one of the side-walls as indicated at 17′, which like the walls is lined with opal ground-glass on its interior face, and closes the rear opening in a light tight manner when locked in such closed position, by any suitable locking device, 17².

Firmly secured in position in a suitable circular orifice formed in and thru the front-wall of the housing is the cylindrical projection-tube 18, within which is supported the focusing-tube 19, provided on the exterior with the downwardly extending rack-gear 20, meshing with a gear-pinion (not shown) actuated by the milled thumb-nut 21, for reciprocating the focusing-tube 19, in and out of the projection-tube 18, in the well known way.

A lens ring 22 which carries on its front face the filter-holder or frame 23 is removably secured in known manner upon the outer end of the focusing tube 19. The filter holder preferably is of the rectangular open topped form shown with the slide holding bottom and side-grooves 24 and 24′ (Figs. 6 and 7) usually three in number as shown, into which may be removably successively slipped and supported a variety of different colored or neutral intensity varying glass filter-plates 26, lifted in and out of position by the upwardly extending handles 26′; or the face plate of a Nicol prism or other light modifier, polarizer, analyzer, etc., by the use of which the light projected upon the screen and testing objects, may be made of any suitable desired intensity variety, color or tint.

Supported securely by the lens-ring 22, at its rear end, but so as to be partially revolubly movable thereon, is the milled-edged diaphragm ring 27, carrying and by its rotation opening and closing, the light-stop iris-diaphragm 28, of the well-known form of construction, by the variation of the light orifice 28′ of which the intensity of the light-image projected upon the test cards or objects at B, may be varied within large limits; and for convenience of description, such iris-diaphragm 28, will be hereinafter referred to as the stop-diaphragm.

That the size of the iris light-aperture may be at all times accurately known, a hand or pointer 29, is carried upon the rear face of the diaphragm ring 27, which extends out over a translucent suitably marked indicator scale 30, covering a scale-slot 30′, formed in and thru the wall of the focusing-tube 19, and extending peripherally the length of the rotary path of movement of the diaphragm ring 27, in moving the stop-diaphragm 28, from the fully open to the fully closed positions.

Firmly secured in position in any suitable manner upon the rear end of the projection-tube 18, is a frame-ring 31, carrying the peripherally extending back-plate 31′, and the inlet diaphragm ring 32, revolubly mounted upon the frame-ring 31, in the same manner as is the diaphragm ring 27, upon the lens-ring 22, and by its rotary movement opening and closing the iris-diaphragm 33, (hereinafter for convenience of description termed the light inlet-diaphragm in like manner supported therein, and operated from fully open to fully closed position by the rotary movement of the ring 32, such inlet-diaphragm ring 32, being provided on its periphery with endless-screw gear-teeth meshing with an endless-screw 36, carried by a shaft 36′, revolubly supported in journal-boxes 37, 37′, formed integral with the back-plate 34, which shaft 36′, extends out thru the wall of the housing, and also thru the outer wall 38, of the gear-box 39, and is provided at its outer end with a hand actuated crank 36², by which the shaft is rotated to open or close the diaphragm 33.

Secured to or preferably formed integral with the peripherally extending plate 31′, of the frame-ring 31, in such positions as not to interfere with the rotary movement of the ring 32, or its operation in opening and closing the diaphragm 33, are studs 40, (one only of which I have shown in Fig. 6) preferably three in number located at equidistant peripheral points on the plate 31′, and extending rearward therefrom; and secured upon the outer ends of such studs by posts 41, is the light stop-plate 34, having the square rectangular central light-inlet orifice 35, covered by a ground-glass light-diffusing plate 42, supported at the edges in any suitable manner on the outer side of 34, so as to wholly cover the square light inlet orifice 35; whereby by reason of such ground-glass plate 42, and the opal ground-glass inner walls 16, of the housing, the light projected will at all times be wholly and perfectly diffused light.

Figure 3:
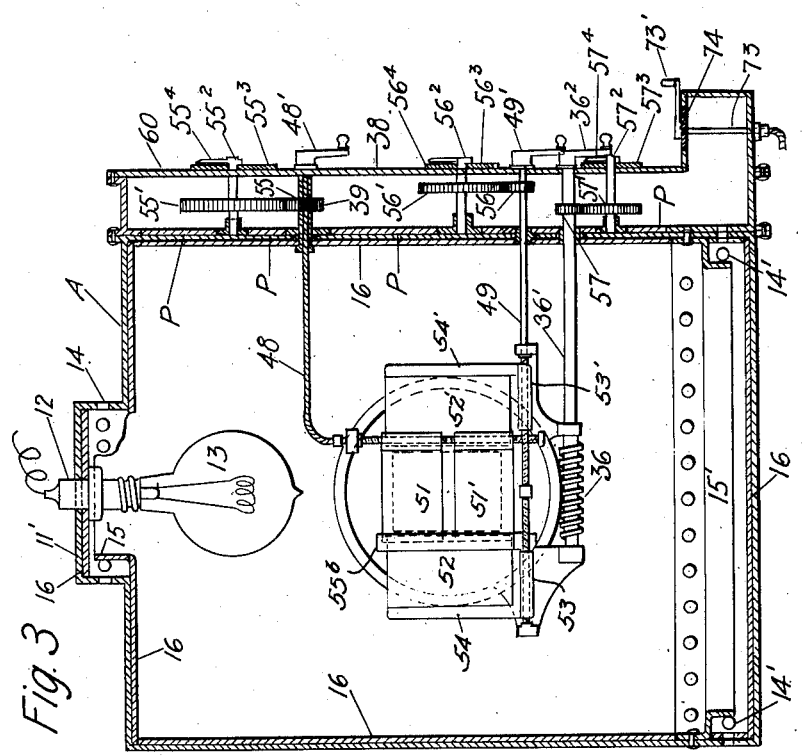

Formed integral with the stop-plate 34, or with extensions 43 thereof, are two vertically alined journal-boxes 44, and 44′ (Figs. 5 and 6); and the similar horizontally alined journal-boxes 45 and 45′, in which are respectively revolubly supported the right-and-left-hand threaded screw-shafts 46 and 46′; each of which is held in position against longitudinal movement by washers 47, pinned thereto, or in any other desired manner; the vertical double-screw shaft 46, being attached at its upper end to the shaft 48 (preferably of the flexible-form shown) actuated by the hand-crank 48′, while the like horizontal double-screw shaft 46′, is attached to or formed integral with the shaft 49, actuated by the hand-crank 49′, both of which cranks are exterior to the gear-box 39, (Figs. 2, 3, and 4).

The upper screw-thread of the vertical double-screw 46, carries threaded thereon a screw-sleeve 50, and the lower screw-thread a like screw-sleeve 50′, preferably and usually, as are all the metallic parts of the light-projecting apparatus save the housing, formed of brass, bronze, monel or other metal, not liable to extreme oxidization; and the screw-sleeve 50, is formed integral with or firmly otherwise secured to the horizontal upper light stop-plate 51, while the screw-sleeve 50′, in like manner carries the lower horizontal light stop-plate 51′. And in substantially similar manner the vertical light stop-plates 52 and 52′, are connected with the screw-sleeves 53, and 53′, reciprocally moved inward or outward by the rotation of the horizontal double threaded screw-shaft 46, in one direction or the other; such vertical but horizontally reciprocable light stop-plates 52 and 52′, being usually and preferably provided unless the same already appears at their vertical outer edges (Figs. 3, 5, and 8) with the stiffening end-bars 54, 54′, connected at their lower ends respectively with the screw-sleeves 53 and 53′; such sleeves, and their respective end-bars 54 and 54′, and their stop-plates 52 and 52′, being usually and preferably formed integrally of brass, etc., out of one piece of metal.

As clearly shown in Figs. 3, 5, 6, and 8, the free ends of the horizontal vertically reciprocating light stop-plates 51 and 51′ are slidingly supported in a slide-slot or way, 55ª, formed in the inner face of a guide-bar 55ᵇ, supported at the ends only by studs 56ª, only one of which is shown, formed integral with, or soldered or brazed to the back-plate 34. The vertical horizontally moving light stop-plate 52 is adapted to slide in and out underneath the guide bar 55ᵇ between the upper and lower studs 56ª. In like manner the co-acting vertical light stop-plate 52′ is slidable in and out underneath the screw-sleeves 50 and 50′. By this construction and arrangement it will be seen that the character of the diffused-light beam admitted to the projection-lens L, may be varied in shape from that of a most minute square (made by bringing the four light stop-plates 51 and 51′ and 52 and 52′, almost but not quite in contact, at their central meeting edges) to that of an elongated horizontal slit of any width, say that of the orifice 35, in the plate 34; (this when the plates 52, and 52', are thrown fully outward to the limit of their movement, as shown in full lines in Fig. 5, so as to uncover the light-orifice 35, of the back-plate 34, to its full horizontal width, while at the same time, the horizontal but vertically reciprocable stop-plates 51, and 51', are thrown but a slight distance apart, at their adjacent meeting edges, as shown in full lines in such Fig. 5) to a complete enlarged square of both the width and vertical length of the orifice 35, made by throwing the plates 51 and 51', backward into their extreme outward positions (indicated in dotted lines in Fig. 5) while the plates 52, and 52', are still in the fully outward possition indicated in full lines.

If now it should be desired to have a non-rectangular beam of light projected upon the screen B, this can be done by manipulating the crank $36^2$, so as to turn the same in the proper direction which thru the endless-screw 36, will turn the diaphragm-ring 32, so as to gradually close the light-inlet diaphragm 33, in such manner as to first gradually cut off the corners of the large (or small) square of light being transmitted; until the beam becomes a complete circle of any required size; while at the same time the intensity of the light transmitted (while leaving the beam-image projected of the same size) may be varied within wide limits either by gradually opening or closing the stop-diaphragm 28, by rotation of the diaphragm-ring 27; or by manipulation of the illuminating lamp-rheostat R; by neutral colorless filters of different densities in filter holder, by manipulation of Nicol-prism (polarizer and analyzer) in filter holder; or by a combination of operation of both R, and 28; or any suitable use singly or collectively of such other devices.

It is highly essential in nearly all cases, and at intervals, especially in the case of making diagnostic tests of persons having progressive optical dieases, to keep accurate record of all the conditions under which such several tests have been made; and for such reason, upon each of the shafts 48, 49 and 36' (Fig. 3), is usually mounted a gear-wheel of comparatively small diameter, indicated respectively by the numerals 55, 56, and 57, meshing with much larger gear-wheels numbered respectively 55', 56' and 57', all secured to and supported upon revoluble shafts $55^2$, $56^2$, and $57^2$, which extend out thru the removable wall 60, of the gear-casing (provided to protect such gearing from dust, etc.,) and centrally thru a suitable indicating-dial secured to the outer face of the wall 60, which dials are indicated respectfully by the reference numerals $55^3$, $56^3$ and $57^3$, (Figs. 3 and 4); and rigidly secured upon the outer ends of said shafts are indicator-hands shown respectively at $55^4$, $56^4$ and $57^4$, the indicator hands $55^4$ and $56^4$ indicate by their positions upon adjacent dials $55^3$ and $56^3$ (usually in millimeters or subdivisions thereof), respectively the vertical and the horizonal, measurements of the variable rectangular light orifice formed by the positioning of the movable vertically adjustable stop-plates 51 and 51' and the like horizontally movable and adjustable stop-plates 52 and 52'. In the case of the iris-diaphragm dial $57^4$, the diameter of the iris light-orifice, of the diaphragm 33, at that particular moment is indicated by the position of the indicator hand $57^4$ relative to the dial $57^3$, while in like manner the stop iris-diaphragm 28, immediately to the rear of the projecting-lens, has its positional diameter of the light-orifice 28', indicated by the pointer-hand 29 on the illuminated-scale 30.

In all cases the large and small intermeshing indicator gear-wheels, are of such tooth-ratios, that there will be less than a complete revolution of the indicating-hands, etc., to the full throw of the iris-diaphragm, or the coacting stop-plates 51, 51', and 52, and 52', as the case may be, from fully open to fully closed positions.

When it is desired that color and light sense tests should be made, or the test objects viewed by monochromatic light, this is done by inserting proper removable transparent adjustable light filter-plates 26, of the proper color, in the filter-holder 23, on the outer face of the lens-ring 22, so as to project the light-rays in the proper color upon the screen B; or upon the test-objects carried thereby; or neutral absorption screens or filters, singly or in plurality, may be used; or a light-polarizer or analyzer, (not shown) of the Nicol-prism, or other suitable type may be used, either alone or in combination with the filter-screens; and for the purpose of positioning the plates carrying the Nicol-prism or other analyser the filter-holder 23, is provided with a plurality of side and bottom holding-grooves, of any suitable plural number (three being shown in Fig. 6,) to receive and hold such devices in operative position successively or simultaneously. And while such triple grooved filter-holder is shown in the drawing, as being formed separate from the lens-ring 22, it may if desired be formed integral therewith.

The test-card C, is of the Snellen or any other suitable type, as shown in Fig. 1, and is usually and preferably removably supported in the screen-frame B, having the grooved side standards 61 (Figs. 1 and 2) into which the Snellen, or other lettered test-card C, may be slipped, and one form substituted for another at any time; and usually the frame B, is mounted upon a base-piece 62, preferably for purposes of stability, of the tripod form shown, the supporting-feet 62' of which are provided with bottoms of felt, (not shown) or other non-frictional material to permit of the same being moved without friction over the top surface of the supporting table D.

The light-projecting apparatus housing A, is secured in any desired manner upon a suitable base-plate 64, having a rearward extension 64', upon which is carried a suitable rheostat R, and the ammeter N, (Fig. 2) by which the intensity of the light given by the lamp 13 is controlled, and the amperage of the current indicated.

The base-plate 64, is provided with a downwardly projecting supporting metallic sleeve 65, fitting upon the top of the supporting-standard rod 66, so as to be revoluble thereon, (the sleeve 65, being provided with a set-screw 65', for rigidly securing the same against movement when in proper projecting position; and such rod 66, is reciprocatingly supported in vertical position in a table-sleeve 67, secured to the table D, by a clamp-screw 67'; and the rod 66 is provided with a rack 66' on one side by which the same may be raised or lowered by the rotation of a small pinion or gear-wheel meshing with such rack, rotated by a hand-crank $66^2$; a pawl-and-ratchet, set-screw or other suitable device, (not shown) being provided to retain such supporting-rod 66, in any required raised position. And formed integral with the sleeve 67, is a horizontal sleeve 68, in which reciprocates the screen-rod E, upon the outer end of which is connected by a pivot-joint 69 to the forward end of the base-piece or tripod 62 which carries the screen-frame B. The screen-frame B may be adjusted to any required angular position relative to the axis of the beam of light projected from A and held in such position by any suitable means, such as a binding screw; and the screen-rod E, is usually and preferably provided with index-marks in centimeters and millimeters, as indicated at E', of Figs. 1, and 2, showing the distance of the screen-frame B, from the light projecting housing A; the rod E, being secured firmly in any required position in the horizontal slide-sleeve 68, by means of a set-screw 68'.

Revolubly supported by the tripod base-piece 62, below the test-card C, is our improved rotary test-object T, which we have found in practice to be far superior to test letters, for many tests, and also far superior to all known devices for the detection of astigmatisms. While such rotary test object may be of many and various forms and contours, from that of a single bar, pivoted at one end or at the center, so as to be capable of being positioned at any required angle to the perpendicular, thru the most minute and micrometric measurements, or of many broken circular or other forms; and one of the many forms of such rotary test-objects we have found to be of the highest efficiency, by actual experiment and practical experimental use, is that of a broken-circle, of any suitable color, in strong contrast with the back-ground upon which it is superposed. In Fig. 1 a test-object T is shown in the form of a jet-black circle upon a brilliant white background. The said circle is broken at the point 70 so as to show a white interruption or slot. The said test-object C is mounted or painted upon a revoluble disk of any required suitable diameter, say from about fifteen to thirty cm. and the said circle is usually aproximately one-third of the diameter of the said revoluble supporting disk. The said disk is in turn usually and preferably superposed and supported upon a white plate or board 71 supported in the bottom portion of the screen-frame B. The said disk upon which the test-object T is shown is supported upon a short shaft (not shown) which may be rotated in any suitable and convenient manner. Preferably rotation of said shaft is effected by a flexible shaft 72. The rear end of the latter is connected with the said shaft and the opposite end thereof is connected to the lower end of a short vertical shaft 73'' to the top end of which is connected the hand crank 73'. The position of the said crank 73' with relation to the indicating dial 74 indicates the position of the white interruption or slot 70 of the test-object T. The dial 74 is illuminated by light from the lamp 13 which passes into the gear-box 39 through perforations P in one of the walls of the lamp housing. It will be understood that the position of the shaft 73'' and the dial 74 may be changed to any other part of the apparatus as may be found to be convenient and desirable. It is possible that through wear, twisting of the flexible shaft 72, or from some other cause the exact position of the interruption or white slot 70, constituting a test-break, may not be correctly and exactly indicated upon the dial 74. In order to test the accuracy of the position of the test-object T with respect to the dial 74 it is proposed that an annular degree or protractor-disk 76 (see Fig. 1) may be placed temporarily over the disk on which the test-object T is mounted or painted. By placing the protractor-disk 76 in proper relation with respect to the dial 74 and by then comparing the position of the white interruption or slot 70 with the said protractor-disk it may be ascertained whether or not the said test-object T is in proper relation to the dial 74.

It will be understood that a projecting lens L of any desired size or diameter may be employed but we have found in the use of the apparatus embodying our invention in actual practice that a lens of 7.5 cm. diameter and of a focal length of 15 cm. is highly efficient and satisfactory. The projection tube, the co-acting and co-ordinating mechanisms, and the various mechanical parts embodied in the construction of the apparatus should be of appropriate sizes or dimensions as compared with the diameter and focal length of the said lens. The usual distance of the frame B, upon which the test-object is supported, from the lens L, is approximately 81 to 82 cm. although it will be understood that this distance may be substantially decreased or diminished and still permit the obtaining of efficient test effects.

It will be understood that suitable illuminating means other than an electric light may be employed. We have found, however, in practice that a well seasoned type "C" Mazda incandescent electric filament lamp of the round bulb stereopticon form and of 100, 250 or 500 watts capacity, depending upon the range of illumination desired, is well fitted for use in eye testing operations and is of high efficiency.

To form the calibration-chart shown in Fig. 9, for actuation of the stop-diaphragm 28, to give any required intensity of light, which was derived by photometric measurement from which the plotted-curve chart shown in Fig. 10 was derived, the lamp-housing A, was positioned on a photometer-bar, at a distance from the photometer head equal to its original distance from the test-object frame B. The scale was then gone over point by point, and the meter-candle value of the light at the photometer-head was measured, and the curve of Fig. 10, plotted therefrom.

One great desideratum in vision testing is to be able to gradually and by minute degrees, vary the size or shape of a test-object, while keeping the illumination constant; or to vary the illumination, upon a test object of constant size and shape. This new method is provided for, in our new and improved apparatus by varying the size and shape of the light-beam-projected. This is accomplished by manipulation of the vertical and horizontal light-stop-plates, and of the rear inlet iris-diaphragm 33, adjacent thereto, or by a combination of mutual adjustments of the two sets of adjustable stop-plates and of such diaphragm 33. In such case it is preferable to use at times a plain white, or colored test-card in place of the printed Snellen or other chart, and let the projected image formed by the light beam alone serve as the test object. And by merely having the shafts 48, 49, and 36′, all three of the flexible form, and quite slack, and by mounting the stop-plate 34 on the three supporting studs, carried by the annular plate 31, of the ring 31′, in such manner as to be capable of rotation thereon to a little over a quarter of a complete revolution, long narrow light-beams may be positioned by projection upon the white-card, and varied both as to size, intensity of illumination, color, and angular position, thru the widest of ranges; in which case, a suitable crank-actuated shaft, illuminated dial, and connecting mechanism is provided for rotating the stop-plate 34, for changing the angularity of the projected narrow elongated beam of light.

And it will be seen with our said improved apparatus, when the Snellen, or other substantially similar type of test-card having any letters, or other test-characters printed thereon, are used; the entire card, or a single line, or a plurality of lines of letters, or only a single letter or other character, may be illuminated at a time, and the intensity of the light projected to illuminate the same, varied from total obscurity, to the highest illumination which the apparatus is capable of projecting; and all this thru micrometrically indicated measureable degrees, which may be recorded for future reference, diagnosis, study, and comparison.

The testing of the color sense in terms of the amount of light required to arouse the color sensation is provided for very simply by inserting the appropriate color filters in the filter holder 23 and reducing the light intensity to the minimum requirement. Color sense apparatus heretofore and at the present in use seems to be limited to the testing of such gross deficiencies as are classed as color blindness. Such apparatus is of little use for detecting the smaller changes of sensitivity that mark the advance and recession of many pathological conditions and disturbances. The present apparatus, among other uses, is designed for detecting and measuring any degree of the deficiency and is so far as we know the only one that has been offered to the ophthalmologist which is feasible for office work.

One of the chief uses to which our improved visional testing apparatus can be put is in the carrying out of our new and improved method of using a variable illumination as a scale, instead of employing a visual-angle scale as heretofore, for determining small differences in the resolving power of the eye. Used in this way the illumination scale becomes in effect an amplified scale. That is, while the visual angle scale stands by definition in a 1:1 relation to acuity, several divisions of the illumination scale correspond to one on the visual angle scale. The sensitivity of the illumination scale for detecting small differences in acuity due to refraction errors is multiplied, therefore, in proportion to this amplification, and this gain in detecting small differences in acuity due to refraction errors is analogous to the gain in power to detect small differences in the deflection of the magnet system of a galvanometer by means of the amplification accomplished by the use of a tangent scale at a distance of one or more meters.

Which test principle we consider to be broadly new as to both such method and as to the new and improved apparatus designed by us for carrying out such method, as well as other methods of testing, new and old; all as hereinafter more particularly pointed out in the claims.

One of the chief uses, and valuable features of our visional testing apparatus lies in the accuracy with which, by its use, either in carrying out our new method, or other methods, even slight astigmatism, may be located and its degree determined.

It is not infrequent to find that in cases of low astigmatism, with the full illumination of a test-object presenting no smaller gradations in visual angle than are found in the Snellen chart, the observer is able to detect no difference in the case or clearness of discrimination of the test character through a range of from 20-40 degrees in the placement of the correction. This difficulty is especially annoying in the case of children and the unintelligent, untrained and subjective types of adult. In such cases the apparatus shown here is especially helpful. With it a minimum is left to the comparative and observational powers of the subject. All that he is required to do is to indicate the position of the test object; that is, in the construction shown, the position of the white interruption or slot 70 in the test-object T, the most favorable amount and placement of the correction being determined by the minimum amount of illumination at which he is able correctly to give this indication.

When the eye is fully corrected this minimum should be the same for any meridian into which the opening in the test object can be turned. The apparatus possesses ample sensitivity, as our results show, for the detection of errors smaller than 5 degrees in the placement of the correction of a low astigmatism or of 0.12 diopter in the amount of the correction.

In testing for astigmatism the apparatus can be used in different ways depending upon the experience and preference of the operator. For example, the minimum amount of light required to discriminate the test object could be determined for one meridian and the setting of the light control be held constant while the test-object is rotated into the different meridians, the person tested being required to judge in each case whether the same or more or less light would be required for its discrimination. This would serve as a rough indication of whether or not the eye is astigmatic. The exact meridian of the defect, that is the meridian in which the greatest amount of light is required to discriminate the opening in the circle, could be determined through a series of settings of the test-object and the light control. The placement of the correction having been determined, its amount could be found by the strength of cylinder required to render the minimum illumination needed to discriminate the test object the same for all meridians, or more roughly speaking the meridian of the defect and at 90 degrees either way from this position. A quicker method is first to make an approximate determination of the amount and placement of the correction by the clinic methods and employ the illumination method only for a more precise determination. In using this method as a refinement on the clinic methods; the procedure which we ordinarily employ is as follows: The patient's eye is fitted with a cylinder of the strength and placement indicated by the clinic tests and the minimum amount of light required to discriminate the opening of the circle is determined in four positions; two in the meridian of the cylinder axis and two in the meridian at right angles to this. If the minima are not equal in these four positions, the cylinder axis is shifted and the determinations are made again; the four positions of the opening of the circle always being in the meridian of the cylinder axis and the meridian at 90 degrees from it. If no placement of the cylinder is found which gives equal minima for the four positions, the strength of the cylinder is changed. The strength and placement of cylinder which requires both equal and the smallest amounts of light for the four positions of the test-object is accepted as the final correction.

By the use of our said new and improved vision testing apparatus, in the carrying out of our new and improved method of vision testing, herein, disclosed, described and claimed, the following results, hitherto and prior to our said invention or inventions never before obtained in the art of vision testing, may be easily and quickly obtained, namely: (1) The illumination of the particular test-letter or object being used at the moment, may be varied by micrometrically and photometrically indicated degrees, from the threshold of visional perception of either eye of the person under test, upward to the fullest possible illumination, or reversely downward to visional total disappearance, without any change whatever in the color value of the light so projected. (2) Without varying the intensity of illumination, the light may be changed thruout the range of the spectrum. (3) A single test-letter or test-object may be illuminated at a time while leaving those adjacent unilluminated, and invisible; or any desired plurality thereof may be so illuminated; or a single horizontal, or perpendicular, line of letters or test objects; or any desired plurality of such lines, may be so illuminated, and the light varied in intensity, or in color or in both simultaneously, from the highest possible illumination to below the threshold point of visional perception of either eye of the test-person; or simultaneously, or in sequence the shape of the transmitted beam may be varied within wide limits. (4) Acuity of vision at low illuminations, of either eye may be tested, and accurately calibrated, determined; and recorded; for use at future times in making future tests, for determining what, if any, pathological visional changes have occured in the interim. (5) And in like manner the eye may be tested for astigmatism, or resolving power, etc., and in like manner calibrated, determined and recorded for like use in making future diagnostic tests; and many other capabilities and tests, for almost innumerable other optical determinations, of diagnostic and other character, may be made by the use of our said new and improved apparatus for visional testing, not alone in the carrying out and performing of our new and improved method of visional testing, but in other ways and for almost innumerable other purposes and tests, which will at once suggest themselves to any skilled oculist, opthalmologist, etc., when the necessity therefor arises; all without in any manner departing from the broad scope of the generic claims hereof either of the method, or the apparatus, so disclosed.

The present old and conventional way of using the visual angle scale for eye testing is to hold the illumination constant and vary the size of the visual angle until the detail can be discriminated. The differences in resolving power are measured and indicated by the smallest value of visual angle that is required. In our method we hold the visual angle constant and find the lowest or minimum value of illumination that is required to discriminate the detail. Differences in resolving power in the different meridians in case of an astigmatism are detected and indicated by the different amounts of light which are required just to discriminate the break in the circle when turned into the different meridians. The advantage of using the illumination scale is its vastly greater sensitivity for picking up small differences in resolving power in the different meridians. Differences in resolving power which require so little change in size of visual angle as to be very difficult to measure require larger and easily measurable changes in intensity of illumination.

We could of course, use both scales with our apparatus if we wished. That is we could change either the visual angle or the intensity of illumination or both, by using a test-object which is variable in size; as is the projected image of the light-beam from our apparatus here shown; and it is preferable, when the elongated light-beam is used, and rotated to different meridians, to place an opaque bar in position over the center of the light slit so that there will be two parallel slits of light; and then both kinds of tests for astigmatism may be made by turning the light slits to different meridians, namely; first, by keeping the width of the light beams constant and varying the illumination; or second, by keeping the illumination constant and varying the width of the beam or beams of light. And thus these two forms of tests may be checked one against the other, whereby liability of error will be reduced to a minimum.

We claim:

1. The method of illuminating uniformly a test chart for the purpose of testing visual acuity which comprises the formation of an evenly illuminated aperture, projecting an image of said aperture upon said test chart and varying the intensity of illumination of said image while maintaining uniformity of distribution of illumination in the image without varying the size, shape or color thereof.

2. The method of ascertaining visual acuity which comprises the measuring of the amount of illumination required to enable a person to discriminate the details of a test object which subtends a visual angle of constant value at the eye.

3. The method of testing vision for astigmatism of the eye which comprises the rotation of a test object of constant size about its center as an axis so as to locate a detail thereof in different meridional positions and measuring and comparing the amount of illumination required to discriminate said detail when in such different positions.

4. The method of testing vision for ascertaining the astigmatism of an eye, comprising as a step the use of the illumination scale to detect and indicate differences in the resolving power of the eye in its different meridians.

5. The method of ascertaining the meridian and the amount of astigmatism of an eye which comprises the determining for the different meridians of the eye the difference in the amount of illumination required to discriminate a detail of constant visual angle in the different meridional positions of said detail.

6. The method of producing upon a screen a colored patch of uniform color and brightness throughout its entire area for testing the sensitiveness of color vision which comprises the projection of a magnified image of an evenly illuminated relatively small aperture onto a screen, interposing a filter plate of selected color in the path of said projected image to impart a selected color thereto, and varying and measuring the intensity of illumination of said image from obscurity to maximum illumination to thereby vary the amount of color in said image from obscurity to full saturation.

7. The method of producing upon a screen a colored patch of uniform color and brightness throughout its entire area for testing the sensitiveness of color vision which comprises the projection of a colored image of an evenly illuminated relatively small aperture onto a screen and varying and measuring the intensity of illumination of said image from obscurity to maximum illumination to thereby vary the amount of color in said image from obscurity to full saturation while maintaining uniformity of illumination in said image throughout its entire area at any moment.

8. The method of producing upon a screen a colored patch of uniform color and brightness throughout its entire area for testing the sensitiveness of color vision which comprises the projection of a magnified image of an evenly illuminated relatively small aperture onto a screen, interposing a filter plate of selected color in the path of said projected image to impart a selected color thereto, varying and measuring the intensity of illumination of said image from obscurity to maximum illumination to thereby vary the amount of color in said image from obscurity to full saturation, and simultaneously varying the said aperture 9. The method of producing upon a screen an illuminated patch of uniform brightness throughout its entire area for testing the sensitiveness of eyes to light which comprises the even illumination of an aperture by a light of unvarying character, projecting a magnified image of said aperture onto a white screen, and varying the brightness of said image from obscurity to high intensity.

10. The method of testing vision for acuity, comprising the illumination of a suitable visional field from complete total obscurity by gradually increasing the illumination by micro-photo-metrically measurable recordable degrees of intensity, and thus determining in minute measurable degree the intensity of the minimum illumination required for the acuity threshold of the patient being tested, and then reversing the process to determine the degree of illumination at which perception ceases.

11. The method of testing vision, for astigmatism, and other forms of ametropia comprising the variable positioning at a plurality of different angles of a movable test-object, and gradually illuminating such test-object in its different angular positions from total obscurity to clear optical perception through micro-photo-metrically measurable degrees of intensity.

12. The method of testing vision, for astigmatism, and other forms of ametropia comprising the projection upon a screen of an elongated light-beam, image and changing the angular position of such light-beam through measured indicated micro-metric degrees of angularity, while varying the light intensity from total obscurity to perfect optical perception by the patient, by micro-photo-metrically measurable degrees.

13. The method of testing vision, for astigmatism, and other forms of ametropia comprising the projection upon a screen of an elongated light-beam, and changing the angular position of such light-beam through measured indicated micro-metric degrees of angularity, while varying the light intensity from total obscurity to perfect optical perception by the patient, by micro-photo-metrically measurable degrees, and reversely from optical perception to total obscuration again.

14. The method of testing vision, for astigmatism, and other forms of ametropia comprising the projection upon a screen of an elongated light-beam, and changing the angular position of such light-beam through measured indicated micro-metric degrees of angularity, while varying the light intensity from total obscurity to perfect optical perception by the patient by micro-photo-metrically measurable degrees; and simultaneously changing the dimension or dimensions of the light-beam projected upon the screen.

15. The method of testing vision, for astigmatism, and other forms of ametropia comprising the projection upon a screen of an elongated light-beam, and changing the angular position of such light-beam through measured indicated micro-metric degrees of angularity while varying the light intensity from total obscurity to perfect optical perception by the patient by micro-photo-metrically measurable degrees, and reversely from optical perception to total obscuration again; and simultaneously changing the dimension or dimensions of the light-beam projected upon the screen.

16. The method of testing vision, comprising the illumination of a chart carrying suitable test-characters, singly and plurally arranged by projecting a light-beam thereon and varying its intensity, so as to successively bring from obscurity to visional perception single characters, any desired plurality of characters, single lines of characters, plural lines of characters, or all the characters carried by the chart.

17. The method of testing vision, comprising the illumination of a chart carrying suitable test-characters, singly and plurally arranged by projecting a light-beam thereon so as to successively bring from obscurity to visional perception, single characters, any desired plurality of characters, single lines of characters, plural lines of characters, or all the characters carried by the chart; the light-beam image projected upon the screen being varied as to size and light-intensity through micro-metric, and photo-metric measured degrees; and the area of the screen illuminated at any particular time being of the same photo-metric intensity of illumination at all points.

18. The method of testing visional color perception and other forms of ametropia comprising the projection of a light-beam upon a suitable screen through filter-screens of different colors or tints, or intensity of colors or tints placed in sequence in the path of the projected light-beam, and simultaneously varying the photo-metric intensity of the light-beam image projected upon the screen during the use of each particular colored filter-screen, from total obscurity to complete visional and color perception, through measurable, recordable, micro-photo-metric degrees.

19. The method of testing visional color perception and other forms of ametropia comprising the projection of a light-beam upon a suitable screen, through filter-screens of different colors or tints, or intensity of colors or tints placed in sequence in the path of the projected light-beam, and simultaneously varying the photo-metric intensity of the light-beam image projected upon the screen during the use of each particular colored filter-screen, from total obscurity to complete visional and color perception, through measurable, recordable, micro-photo-metric degrees, and also simultaneously and in like manner varying the size, or shape, or both, of the light-image so projected upon the screen.

20. A light-projection apparatus comprising a projection-lens; a housing; an inner surfacing for the housing walls of light diffusing character; a reciprocable focusing-tube supported in the housing wall carrying the projecting-lens; a back stop-plate having a light-inlet-orifice located within the casing in axial line with the focusing-tube axis; a light source within said housing located out of alinement with said tube and orifice, a light-diffusing plate of transparent material covering the light-inlet-orifice of the stop-plate; and mechanism for varying the shape and size of the light-inlet-orifice.

21. A light-projection apparatus comprising a projection-lens; a housing; an inner surfacing for the housing walls of light diffusing character; a reciprocable focusing-tube supported in the housing wall carrying the projecting-lens; a back stop-plate having a light-inlet-orifice located within the casing in axial line with the focusing-tube axis; a light-diffusing plate of transparent material covering the light-inlet-orifice of the stop-plate; and manually operable mechanism for varying the light-inlet-orifice, and for simultaneously visually measurably indicating the several dimensions of the light-inlet-orifice at the moment.

22. A light-projection apparatus comprising a projection-lens; a housing; an inner surfacing for the housing walls of light diffusing character; a reciprocable focusing-tube supported in the housing wall carrying the projecting-lens; a back stop-plate having a light-inlet-orifice located within the casing in axial line with the focusing-tube axis; a light-diffusing plate of transparent material covering the light-inlet-orifice of the stop-plate; and manually operable mechanism for varying the light-inlet-orifice; and means comprising an index or indices for simultaneously visually measurably indicating the several dimensions of the light-inlet-orifices at the moment; the index or indices being illuminated by light from within the housing.

23. A light-projection apparatus comprising a housing; a projection-lens; a light-diffusing reflecting lining forming the inner wall surface of the housing; a back stop-plate having a light-inlet-orifice in line with the axis of the lens located within the housing; and an illuminating-lamp located within the housing positioned therein outside of the common axial-line of the projection-lens and the light-inlet-orifice of the stop-plate.

24. A light-projection apparatus comprising a housing; a projection-tube located in the wall of the housing; a lens-tube reciprocatingly mounted in the projection-tube; a projection-lens mounted in the lens-tube; an adjustable light-stop iris-diaphragm located adjacent to the lens; manually actuated means for moving the light-stop iris-diaphragm from fully closed to fully open positions; an index-device moved simultaneously with the moving of the light-stop iris-diaphragm indicating at all times the diameter of the light-stop orifice at the moment; a back-plate having a light-inlet orifice supported at the inner-end of the projection-tube; a ground-glass plate carried by the back-plate closing the light-inlet-orifice; two light-stop plates simultaneously movable toward and away from one another in one direction so as to completely clear or close the light-inlet orifice of the back-plate, supported by the back-plate; two similar light-stop plates simultaneously movable toward and away from one another in a path at substantially a right-angle to the path of the first mentioned light-stop plates, so as to completely clear or close the light-inlet orifice of the back-plate in like manner when so moved; also supported by the back-plate; an adjustable light-inlet-iris-diaphragm carried by the projection-tube located adjacent to the back-plate, adapted when in the fully open position to completely clear the light-inlet orifice of the back-plate; and when in the opposite position to completely close such light-inlet orifice; manually operated mechanisms for separately actuating the two sets of light-stop plates; like manually operated mechanism for actuating the light-inlet iris-diaphragm; and an illuminated index mechanism for each of such manually operated mechanisms simultaneously movable therewith measurably visually indicating the position at the moment of the light-inlet iris-diaphragm, and of the two sets of light-stop plates.

25. A light-projection apparatus comprising a housing; a projection-tube located in the wall of the housing; a lens-tube reciprocatingly mounted in the projection-tube; a projection-lens mounted in the lens-tube; an adjustable light-stop iris-diaphragm located adjacent to the lens; manually actuated means for moving the light-stop iris diaphragm from fully closed to fully open positions; an index-device moved simultaneously with the moving of the light-stop iris-diaphragm illuminated by the light being projected through the lens-tube, indicating at all times the diameter of the light-stop orifice at the moment; a back-plate having a rectangular substantially square light-inlet orifice supported at the inner-end of the projection-tube; a ground-glass plate carried by the back-plate closing the light-inlet orifice; two-light stop-plates simultaneously movable toward and away from one another in one direction so as to completely clear or close the light-inlet orifice of the back-plate, supported by the back-plate; two similar light-stop plates simultaneously movable toward and away from one another in a path at substantially a right-angle to the path of the first mentioned light-stop plates, so as to completely clear or close the light-inlet orifice of the back-plate in like manner when so moved; also supported by the back-plate; an adjustable light-inlet iris-diaphragm carried by the projection-tube located adjacent to the back-plate, adapted when in the fully open position to completely clear the light-inlet orifice of the back-plate; and when in the opposite position to completely close such light-inlet orifice; manually operated mechanisms for separately actuating the two sets of light-stop plates; like manually operated mechanism for actuating the light-inlet iris-diaphragm and an illuminated index mechanism for each of such manually operated mechanisms simultaneously movable therewith measurably visually indicating the position at the moment of the light-inlet iris-diaphragm, and of the two sets of light-stop plates.

26. A light-projection apparatus comprising a housing; having a light diffusing reflecting inner wall surface; a projection-tube located in the wall of the housing; a lens-tube reciprocatingly mounted in the projection-tube; an illuminating lamp within the housing adjacent to the top-wall; a projection-lens mounted in the lens-tube; an adjustable lightstop iris-diaphragm located adjacent to the lens; manually actuated means for moving the light-stop iris-diaphragm from fully closed to fully open positions; an index-device moved simultaneously with the moving of the light-stop iris-diaphragm, indicating at all times the diameter of the light-stop orifice at the moment; a back-plate having a rectangular substantially square light-inlet orifice supported at the inner-end of the projection-tube; a ground-glass plate carried by the back-plate closing the light-inlet orifice; two light-stop plates simultaneously movable toward and away from one another in one direction so as to completely clear or close the light-inlet orifice of the back-plate, supported by the back-plate; two similar light-stop plates simultaneously movable toward and away from one another in a path at substantially a right-angle to the path of the first mentioned light-stop plates, so as to completely clear or close the light-inlet orifice of the back-plate in like manner when so moved; also supported by the back-plate; an adjustable light-inlet iris-diaphragm carried by the projection-tube located adjacent to the back-plate, adapted when in the fully open position to completely clear the light-inlet orifice of the back-plate; and when in the opposite position to completely close such light-inlet orifice; manually operated mechanisms for separately actuating the two sets of light-stop plates; like manually operated mechanism for actuating the light-inlet iris-diaphragm; and an illuminated index-mechanism for each of such manually operated mechanisms simultaneously movable therewith measurably visually indicating the position at the moment of the light-inlet iris-diaphragm, and of the two sets of light-stop plates.

27. In a light-projection apparatus, the combination with a projection-lens of an illuminating-lamp; a lamp housing in which said illuminating-lamp is situated; a stop-light iris-diaphragm located adjacent to the projection lens in the path of the light; a back-plate having a light-inlet orifice located adjacent to the lamp, the said lamp being out of alinement with the said lens and the said diaphragm; and means whereby the said light inlet orifice is uniformly illuminated.

28. In a light-projection apparatus, the combination with a projection-lens of an illuminating-lamp; a lamp housing in which said illuminating-lamp is situated; a stop-light iris-diaphragm located adjacent to the projection lens in the path of the light; a back-plate having a light-inlet orifice located adjacent to the lamp, the said lamp being out of alinement with the said lens and the said diaphragm; means whereby the said light inlet orifice is uniformly illuminated; and means whereby one or more color filter-plates may be located in the path of the projected light beam.

29. In a vision-testing apparatus, the combination with a projection-lens, of an illuminating-lamp; means for measurably varying the illumination transmitted by the lamp; a measurably indicatingly adjustable stop-light iris-diaphragm located adjacent to the projection-lens in the path of the light; a back-plate having a light-inlet orifice located adjacent to the lamp; mechanism for changing the size and shape of the light-inlet orifice to vary in like manner the size and shape of the beam of light projected by the lens; and visual index indicating mechanism showing the shape and size of the light-inlet orifice at the moment.

30. A light-projecting apparatus, comprising an illuminating-lamp; a projection-lens; an adjustable light-stop iris-diaphragm located adjacent to the projection-lens; an index indicating the diameter of the iris-diaphragm opening at the moment; a back stop-light plate having a light-inlet slot of a rectangular elongated form, and mechanism for revolubly moving the back stop-light plate so as to position the light-inlet elongated slot at any required degree of angularity.

31. A light-projecting apparatus, comprising an illuminating-lamp; a projection-lens; an adjustable light-stop iris-diaphragm located adjacent to the projection-lens; an index indicating the diameter of the iris-diaphragm opening at the moment; a back stop-light plate having a light-inlet slot of a rectangular elongated form, variable as to its width; and mechanism for revolubly moving the back stop-light plate so as to position the light-inlet elongated slot at any required degree of angularity.

32. In a light-projection apparatus for vision testing, in combination, a projection-lens, an illuminating-lamp, a lamp house within which said lamp is located, means for providing a light-inlet orifice located between the said lamp and the said projection-lens, an image of which is adapted to be projected by said lens onto a screen, means located between the said orifice and the said projection-lens in close proximity to the latter for varying the intensity of illumination of the said image while maintaining uniformity of illumination throughout the extent thereof and also while maintaining the dimensions of said image constant.

33. A vision-testing apparatus comprising an angle indicating test object of substantially annular form broken at a single point, means for supporting said test object, means for rotatably moving said test object into positions with the broken point located at any desired point radial to its center of rotation, means independent of the light source for varying the intensity of illumination of said test object, and means for measuring and comparing the amounts of illumination necessary to render said broken point visually perceptible at its different radial positions.

34. A vision-testing apparatus comprising a movable test object which is adapted to be adjusted into all angular positions in a plane substantially at right angles to the line of vision, light-projecting means for illuminating said adjustable test object, and means for varying and measuring the intensity of illumination of said test object at any moment from extinction of visual perception upward to full visual perception.

35. In a light-projecting apparatus for testing acuity of vision, in combination, a light source, a housing for said light source, a tubular projection-lens holder the rear end of which projects into said housing, means for providing a light-inlet opening from said housing into said tubular projection-lens holder, which inlet opening is adapted to be evenly illuminated by the light from said light source, the said means including adjustable members whereby the size and shape of said inlet opening may be varied, a projection-lens mounted in said tubular holder which is adapted to project an image of said light-inlet opening onto a screen, and means located in close proximity to said projection-lens for varying the intensity of illumination of said image from obscurity to intense illumination and at all times maintaining evenness of illuminaiton throughout the entire extent of the said image.

36. In a light-projecting apparatus for testing acuity of vision, in combination, a light source, a housing for said light source, a tubular projection-lens holder the rear end of which projects into said housing, means for providing a light-inlet opening from said housing into said tubular projection-lens holder, which inlet opening is adapted to be evenly illuminated by the light from said light source, a projection-lens mounted in said tubular holder which is adapted to project an image of said light-inlet opening onto a screen, and means located in close proximity to said projection-lens for varying the intensity of illumination of said image from obscurity to intense illumination and at all times maintaining evenness of illumination throughout the entire extent of the said image.

Signed, at the borough of Manhattan, in the county, city and State of New York, this 3rd day of August, 1920.

CLARENCE ERROL FERREE.
GERTRUDE RAND FERREE.